Dec. 17, 1968  E. M. AMIR ETAL  3,417,138
PURIFICATION OF DODECANEDIOIC ACID
Filed June 13, 1966
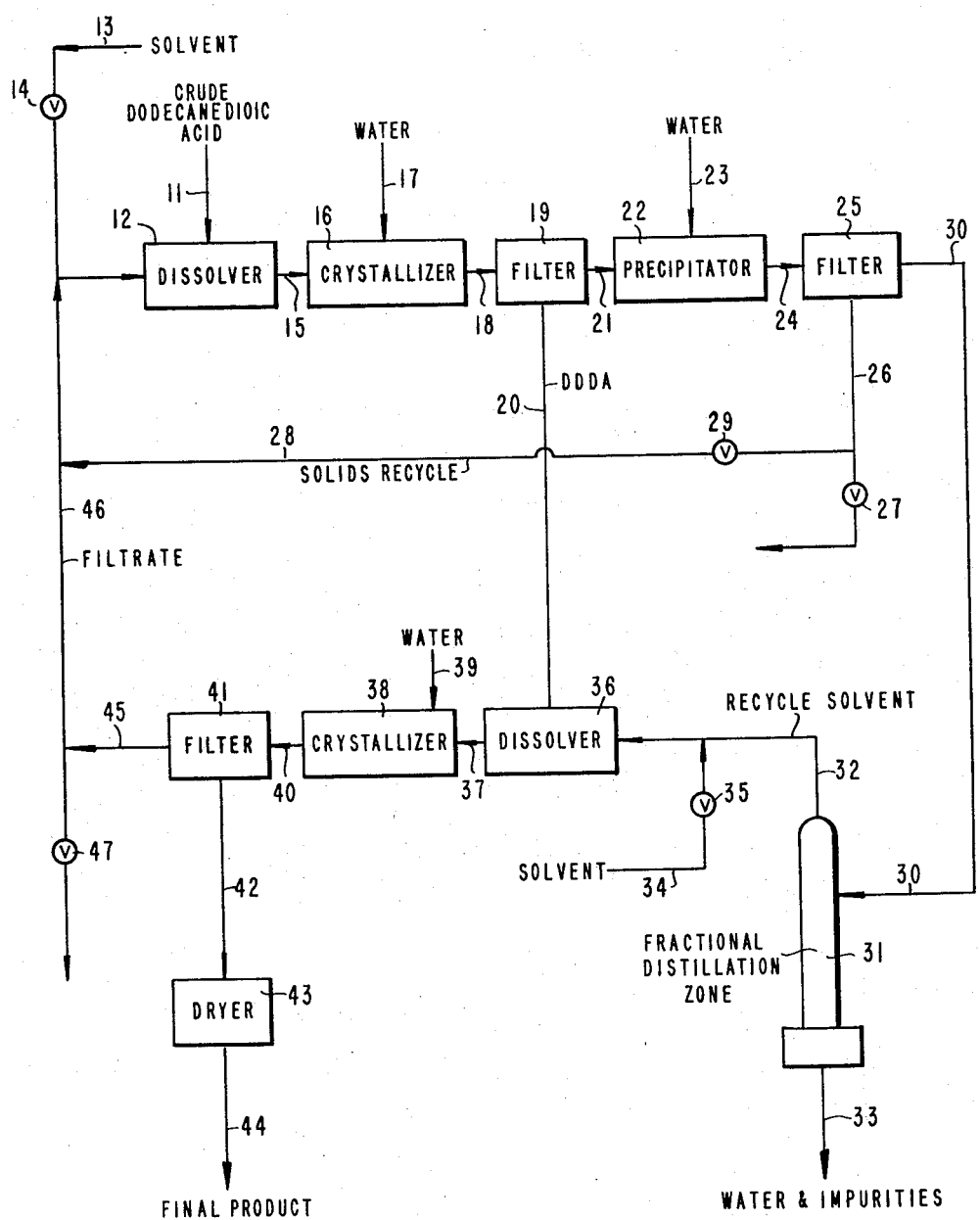
INVENTORS.
EMANUEL M. AMIR,
JAMES K. NICKERSON,
BY
ATTORNEY.

United States Patent Office 3,417,138
Patented Dec. 17, 1968

3,417,138
PURIFICATION OF DODECANEDIOIC ACID
Emanuel M. Amir and James K. Nickerson, Baytown, Tex., assignors to Esso Research and Engineering Company
Filed June 13, 1966, Ser. No. 556,985
8 Claims. (Cl. 260—537)

The present invention is directed to the purification of dodecanedioic acid. More particularly, the invention is concerned with the purification of dodecanedioic acid by crystallization. In its more specific aspects, the invention is concerned with the purification of crude dodecanedioic acid by dissolving the crude dodecanedioic acid in a solvent and recovering purified crystals of the dodecanedioic acid from the solvent.

The present invention may be briefly described as involving a method for purifying crude dodecanedioic acid in which the crude acid is dissolved in a sufficient amount of a polyethylene glycol dialkyl ether at a temperature sufficiently high to form a solution of the acid in the polyethylene glycol dialkyl ether. The solution is then cooled to a temperature sufficient to crystallize the acid from the solution and the cooled acid is then recovered from the solution such as by filtration, decantation, centrifugation, and the like.

The crude dodecanedioic acid is suitably dissolved in the polyethylene glycol dialkyl ether at a temperature within the range from about 50° to about 250° C. A preferred temperature range is about 70° to about 150° C.

The polyethylene glycol dialkyl ether may be employed in an amount from about 1 to about 5 parts of polyethylene glycol dialkyl ether per part of crude dodecanedioic acid. About 2 to 3 parts of the polyethylene glycol dialkyl ether per part of the crude acid is preferred.

The polyethylene glycol dialkyl ethers of the present invention may be used in either the pure state or in solution with water. Water decreases the solubility of dodecanedioic acid and increases the yield of the purified acid. The concentration of water permissible in the solvent depends on the purity level of acid desired. Generally, an amount of water within the range from about 0.02 to about 5.0 parts per part of polyethylene glycol dialkyl ether may be used. A preferred amount of water is in the range from about 0.05 to about 0.5 part per part of the polyethylene glycol dialkyl ether.

A solution of dodecanedioic acid in the polyethylene glycol dialkyl ether is suitably cooled to a temperature within the range from about 15° to about 30° C. Ordinarily, a temperature of about 20° to 25° C. may be employed.

In the practice of the present invention, it is contemplated that the dodecanedioic acid will be recovered from the solution as crystals and then redissolved in the polyethylene glycol dialkyl ether to form a second solution which then is cooled to recrystallize the dodecanedioic acid from the second solution following which the recrystallized dodecanedioic acid is recovered such as by filtration, decantation, centrifugation, and the like.

The polyethylene glycol dialkyl ethers suitable in the practice of the present invention are preferably ethylene glycol dimethyl ether and diethylene glycol dimethyl ether. The ployethylene glycol dialkyl ether may be a mono-, di-, tri- or tetraethylene glycol ether, and the alkyl groups each may have from 1 to 5 carbon atoms. Thus, the polyethylene glycol dialkyl ether may be polyethylene glycol dimethyl ether, diethyl, dipropyl, dibutyl or dipentyl ethylene glycol ether, or may be mixed ethers such as the methyl ethyl ether or methyl propyl or ethyl butyl ether, and the like. In other words, each alkyl group of the polyethylene glycol dialkyl ether has from 1 to 5 carbon atoms.

The crude dodecanedioic acid is ordinarily the crude dodecanedioic acid obtained by nitric acid oxidation of cyclododecanol. This crude dodecanedioic acid contains impurities such as mono-basic acids which, if not removed, act as chain stoppers in polymerization reactions. $C_{11}$ dibasic acids and color bodies also make up the impurities. In the practice of the present invention, these impurities remain dissolved in the polyethylene glycol dialkyl ether from which the purified dodecanedioic acid is crystallized.

The present invention will be further illustrated by reference to the drawing in which the single figure is a flow diagram of a preferred mode.

Referring now to the drawing, numeral 11 designates a charge line by way of which crude dodecanedioic acid containing impurities is introduced into a dissolver zone 12. A polyethylene glycol dialkyl ether is introduced into zone 12 by way of line 13, controlled by vlave 14, from a source not shown. In zone 12, the temperature is within the range from about 50° to about 250° C. under which conditions the crude acid goes into solution. The solution is then discharged from zone 12 by line 15 into a crystallizer zone 16 into which water is optionally introduced by line 17. The solution in crystallizer zone 16 has its temperature adjusted such as by cooling to a temperature within the range of about 15° to about 30° C. The cooling operation may be conducted by any one of several ways such as by having refrigeration coils in the zone 16 or the water may be cooled to cause the cooling operation. By virtue of the cooling operation, crystals of dodecanedioic acid form in crystallizer zone 16 and the resulting slurry is then discharged by way of line 18 into a filtration or separation zone 19. While a filter may be preferred, zone 19 may include decantation, centrifugation, and the like, or combinations of these separation modes. In zone 19, the dodecanedioic acid crystals are separated and withdrawn by line 20 for further treatment, as will be described with the filtrate from zone 19 being introduced by line 21 into a precipitation zone 22 into which water is introduced by line 23. In precipitation zone 22, additional solids comprising dodecanedioic acid are precipitated and the resulting slurry discharged by line 24 into a second filtration or separation zone 25 which, like zone 19, may include other separation means besides a filter. The solids comprising dodecanedioic acid are discharged from zone 25 by line 26 and either discarded from the system by opening valve 27 or recycled through line 28, controlled by valve 29. The filtrate from zone 25 is withdrawn by line 30 and introduced into a fractional distillation zone 31 to obtain the purified polyethylene glycol dialkyl ether solvent as an overhead fraction by line 32 with water and the impurities from the crude dodecanedioic acid being discharged by line 33.

Makeup solvent may be introduced into line 32 through line 34, controlled by valve 35. In any event, the solvent in line 32 is introduced into a second dissolver zone 36 to dissolve the dodecanedioic acid which is introduced thereto by line 20.

The temperature and other conditions in zone 36 are within the range of the conditions in zone 12 to dissolve the dodecanedioic acid and to form a second solution. Likewise, the ratio of the polyethylene glycol dialkyl ether to dodecanedioic acid in zone 36 is within the range employed in zone 12. The resulting solution formed in zone 36 is discharged by line 37 and introduced into a second crystallizer zone 38 which is provided with cooling means similar to cooling zone 16 with water being optionally introduced thereto by line 39. Similar conditions are employed in zone 38 to those employed in zone 16. Similar to zone 16, the cooling may be obtained by refrigeration or by adding chilled water. As a result of the cooling operation in zone 38, purified dodecanedioic acid crystals are formed in zone 38 as a slurry in the polyethylene glycol dialkyl ether, and this slurry is withdrawn by line 40 into a filtration zone 41 or other separation means which may be a decantation or a centrifugation zone. The crystals of purified dodecanedioic acid are separated in zone 41 and withdrawn by line 42 to a suitable drier 43 to remove residual solvent. This may be obtained by heating in a suitable heating means, the amount of heat being sufficient to drive off residual solvent. The final purified product is recovered by line 44. Filtrate from zone 41 is introduced by line 45 into line 46 for return to line 13 and dissolver zone 12. If desired, solvent may be discarded from line 46 by opening valve 47. The solids in line 28 are introduced into line 46 for further purification by solution in dissolver zone 12. Thus, in accordance with the mode of the single figure of the drawing, a method is provided for obtaining purified dodecanedioic acid substantially free of impurities.

Thus, in accordance with the present invention, it has been found that the solubility of dodecanedioic acid at room temperatures is high. Thus, at slightly over 20° C., the solubility of dodecanedioic acid in ethylene glycol dimethyl ether is approximately 20%. In accordance with the present invention, using from 1 to 3 parts of solvent per part of the acid, the yield would be approximately 16%. In accordance with the present invention, the yields may be increased by recycle of the solvent in which the crude acid is dissolved in the solvent, water is added and the solution is crystallized. For example, a reduced pressure crystallizer may be used to cool the solution and remove part of the solvent. Thereafter, solid acid is recovered from the slurry and water or other high boiling liquids in which the acid does not dissolve may be added if necessary to the filtrate to precipitate essentially all of the acid. The solids are separated for recycle and the resulting filtrate is distilled with the overhead consisting of solvent suitable for recycle and the bottoms containing water and impurities, such as monobasic acids, $C_{11}$ dibasic acids and color bodies, are removed. In the second stage recrystallization operation employed in the practice of the present invention, the solvent may flow countercurrently to the dodecanedioic acid.

The present invention will be further illustrated by the following example in which 100 parts of crude dodecanedioic acid containing impurities were dissolved in 300 parts of dimethyl diethylene glycol ether at a temperature slightly below the boiling point of the ether. The resulting solution was then cooled to a temperature of 25° C., and the crystallized solids were filtered from the slurry. Approximately 40 parts of solids were recovered and redissolved in 120 parts of the same ether at its boiling point. The resulting second solution was cooled to a temperature of 25° C., and the crystallized solids were filtered and dried. This cooled dodecanedioic acid had a purity of 99.9+%.

The present invention is quite important and useful in that dodecanedioic acid in a purified form is quite desirable for use in preparation of polyamide resins and other polymers.

The nature and objects of the present invention having been completely described and illustrated and the best mode and embodiment set forth, what we wish to claim as new and useful and secure by Letters Patent is:

1. A method for purifying crude dodecanedioic acid obtained by nitric acid oxidation of cyclododecanol which comprises dissolving said crude dodecanedioic acid in a sufficient amount of a polyethylene glycol dialkyl ether, said polyethylene glycol dialkyl ether having 1–4 ethylene groups and each alkyl group of said ether having 1–5 carbon atoms at a temperature sufficiently high to form a solution within the range of 50° to about 250° C.;

cooling said solution to a temperature sufficient to crystallize dodecanedioic acid from said solution within the range of 15° to about 30° C.; and recovering said crystallized dodecanedioic acid.

2. A method in accordance with claim 1 in which the crude dodecanedioic acid is dissolved in said polyethylene glycol dialkyl ether at a temperature within the range from about 70° to about 150° C.

3. A method in accordance with claim 1 in which about 1 to about 5 parts of said polyethylene glycol dialkyl ether per part of crude dodecanedioic acid are employed.

4. A method in accordance with claim 1 in which water is added to said solution in an amount within the range from about 0.02 to about 5 parts per part of said polyethylene glycol dialkyl ether.

5. A method in accordance with claim 1 in which the solution is cooled to a temperature within the range from about 20° to about 25° C.

6. A method in accordance with claim 1 in which the recovered crystallized dodecanedioic acid is:

(a) redissolved in polyethylene glycol dialkyl ether to form a second solution;

(b) the second solution cooled to recrystallize dodecanedioic acid from said second solution;

(c) said recrystallized dodecanedioic acid recovered.

7. A method in accordance with claim 1 in which the polyethylene glycol dialkyl ether is ethylene glycol dimethyl ether.

8. A method in accordance with claim 1 in which the crystallized dodecanedioic acid is recovered by filtration.

References Cited

UNITED STATES PATENTS

| 2,847,467 | 8/1958 | Steadman et al. | 260—537 |
|---|---|---|---|
| 3,087,963 | 4/1963 | Wiese et al. | 260—537 |
| 3,366,680 | 1/1968 | Minisci et al. | 260—533 |
| 2,916,502 | 12/1959 | Allen et al. | 260—537 |

LORRAINE A. WEINBERGER, *Primary Examiner.*

V. GARNER, *Assistant Examiner.*

U.S. Cl. X.R.

260—531